United States Patent [19]

Polley

[11] 4,106,485
[45] Aug. 15, 1978

[54] SOLAR ENERGY REFLECTING SYSTEM

[76] Inventor: Joseph A. Polley, P.O. Box 361, Massapequa, N.Y. 11758

[21] Appl. No.: 823,131

[22] Filed: Aug. 9, 1977

[51] Int. Cl.² .............................................. F24J 3/02
[52] U.S. Cl. ..................................... 126/271; 350/299
[58] Field of Search ............... 126/270, 271; 237/1 A; 350/288, 289, 299

[56] References Cited

U.S. PATENT DOCUMENTS

| 787,145 | 4/1905 | Brown | 126/271 |
|---|---|---|---|
| 1,479,923 | 1/1924 | Moreau | 126/270 |
| 2,707,903 | 5/1955 | Trombe | 126/270 |

*Primary Examiner*—Kenneth W. Sprague
*Attorney, Agent, or Firm*—Richard L. Miller

[57] ABSTRACT

A solar energy reflecting system which can modify its reflector configuration in accordance with the movement of the sun across the sky. The system includes a circular dish-like housing with upper and lower circular hoops in spaced relationship within the housing which can be displaced relative to each other. A series of reflector panels are sequentially spaced around the peripheral wall of the dish like housing and controlled by the displacement of the upper and lower hoops to lie in an outwardly flared direction and pivot as the hoops are displaced relative to each other. A sensing device detects the position of the sun in the sky and accordingly displaces the hoops to thereby pivot the reflector panels appropriately to give the proper reflector configuration which will provide the best focusing of the sunlight and concentrate it onto a heating coil where the heat can be absorbed and transferred to a storage tank.

10 Claims, 13 Drawing Figures

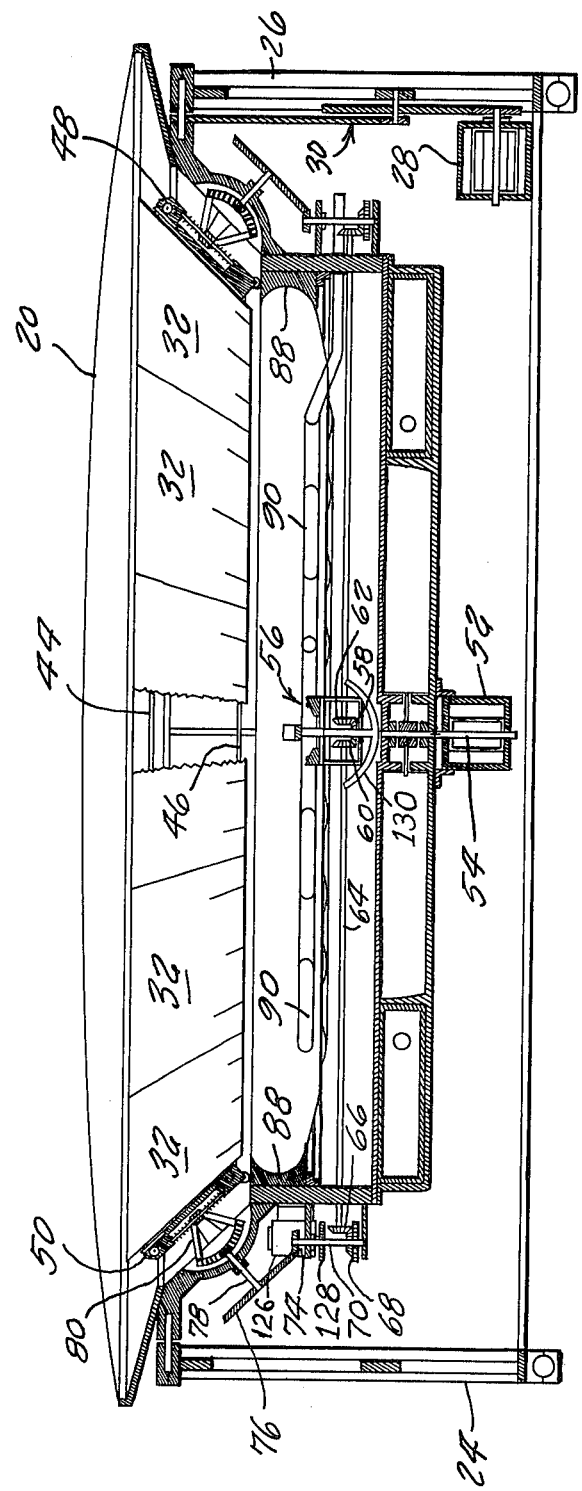

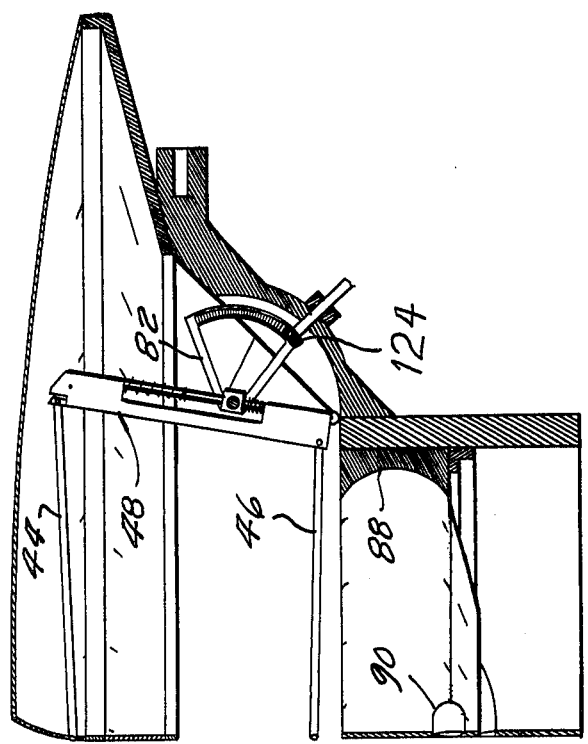
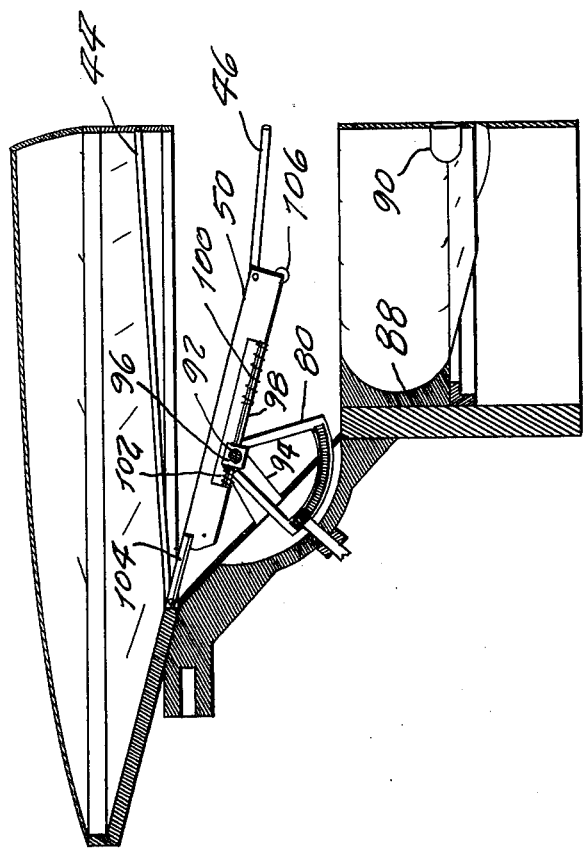

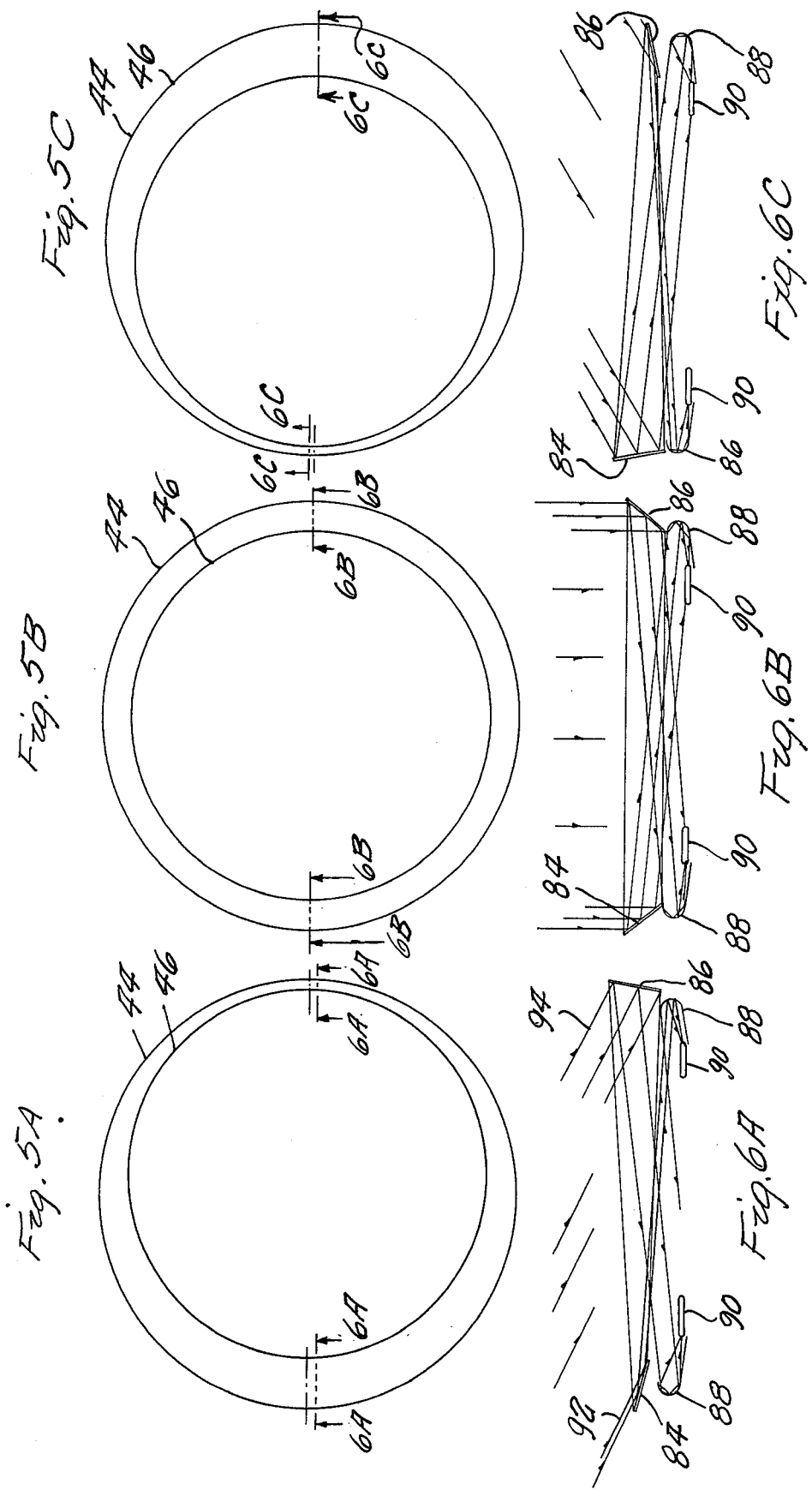

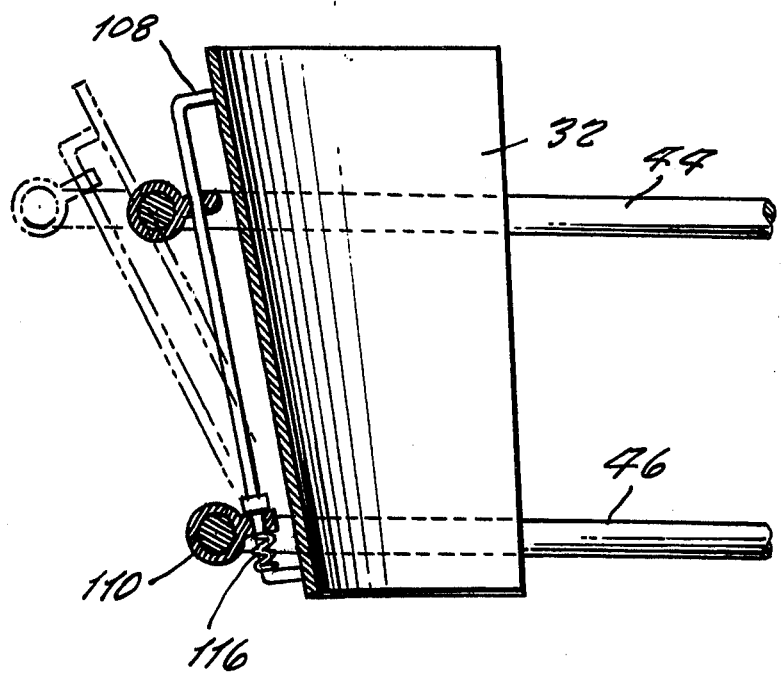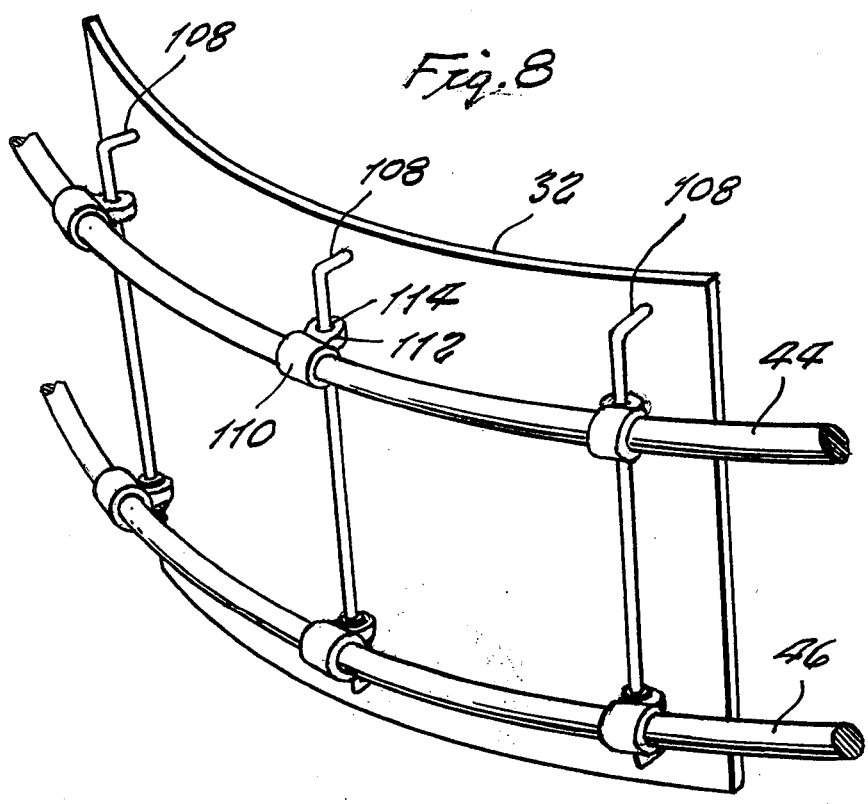

SOLAR ENERGY REFLECTING SYSTEM

BACKGROUND OF THE INVENTION

With the continued shortage of both coal, oil and other types of fuels and the consequential increase in costs of energy sources, there is presently a great interest in utilizing other available energy sources. One such energy source which is readily available is solar energy. The main problem with utilizing solar energy as a source of heat and power is the proper harnessing and gathering of the solar energy to provide sufficient heat for storing and subsequent use. Although the solar energy is plentiful, in order to provide efficient systems for using such energy, enough of the sunlight must be collected and concentrated into an appropriate heating system.

In the prior art there have been many types of solar collection devices each attempting to provide the most efficient reflective system for collecting and concentrating the solar energy. Some of these devices are parabolic in shape, others are dish-like in shape, and numerous other types of configurations have been provided. While many of these have been found useful, one of the basic problems is to place the reflector in an appropriate position to gather the greatest amount of sunlight. During the day, the sun moves along an arcuate path across the sky. Some of the prior art reflectors are stationary and attempt to provide a wide enough area to be able to receive the sunlight in all of its positions along the arcuate path. However, these devices are not truly effective since a large amount of the reflector space will not always be utilized to receive the solar energy. Only the reflectors angularly positioned to face the sunlight at a given direction in the sky will receive the sunrays. The rest of the reflector will be inoperative. Accordingly, the efficiency of such devices is exceedingly low and its use has been extremely limited.

Other prior art reflector systems include a tracking system which attempts to track the movement of the sun across the sky and continuously focus the reflector to face the direction of the sun. While these reflectors are more efficient than the permanently fixed type, they too have not provided sufficient collection and concentration of the sun's rays to find acceptance. One of the reasons for their inefficiencies concerns the angular direction of the reflector system. Although the reflector may utilize a tracking system whereby it faces the direction of the sun, it is apparent that the rays of the sun will not always fall on the reflector at the same angle. For example, in a parabolic reflector, even if it faces toward the sun when the sun is at an extreme Easterly position, more light will reflect off one side of the parabolic reflector than the other. In fact, one part of the reflector probably will not receive any of the sun's rays at all. Furthermore, the angle of reflection off the parabolic walls will not always be the same and much of the reflected light will not be concentrated on a storage system which is to receive the reflected light.

It is therefore evident that for each position of the sun in the sky there must actually be provided a distinctly configurated reflector system which is particularly designed to have reflector surfaces available to receive the sun's rays most efficiently and properly reflect it onto a storage system. With the continuous movement of the sun across the sky, there must therefore be provided a continuously changeable configuration to the solar reflecting system whereby it will provide the most efficient reception and reflection of the sun's rays for that particular instantaneous position of the sun.

Heretofore, the solar energy reflecting systems have been of fixed configuration. Although the entire system may have pivoted or rotated to face the fun, the reflecting system configuration itself has been fixed with panels or reflector surfaces permanelty mounted onto a a support surface or housing. The prior art systems have therefore failed to recognize the necessity of having a continuously changeable reflective system configuration which is adapted to provide the most efficient angular configuration of the reflector surfaces for the instantaneous position of the sun in the sky.

SUMMARY OF THE INVENTION

Accordingly, it is an object of the present invention to provide a solar energy reflector system which avoids the aforementioned problems of prior art devices.

A further object of the present invention is to provide a solar energy reflector system which can modify its own configuration in accordance with the movement of the sun across the sky.

Still a further object of the present invention is to provide a solar energy reflector system which provides appropriate configuration of its reflector surfaces for most efficient operation.

A further object of the present invention is to provide a solar energy reflector system which can track the location of the sun and appropriately position its reflecting surfaces in a direction to receive and concentrate most of the solar energy.

Another object of the present invention is to provide a solar energy reflector system which includes a series of reflector panels which can be positioned to receive the rays of the sun and focus them onto a lower concave reflector surface which concentrates the rays onto a storage unit.

Still another object of the present invention is to provide a solar energy reflector system which can be positioned to face the arcuate path of the sun for a particular season and can also track the movement of the sun across that arcuate path during the course of each day.

A further object of the present invention is to provide a solar energy reflector system which can change its reflective configuration to consistently provide the most concentration of sunlight onto a storage unit.

A further object of the present invention is to provide a solar energy reflector system which is more efficient, superior in operation, more sturdy, durable, and more useful than prior art devices.

Briefly, the present invention provides a solar energy reflector system including a circular dish-like housing which includes outwardly flared peripheral walls. Within the housing is located an upper and lower circular hoop each of which are spaced with respect to the other. The upper hoop is made larger than the lower hoop. A sensing means is available for detecting the position of the sun in the sky. A control means contained within the housing is coupled to both the upper and lower hoops and responds to the sensing means for displacing the hoops relative to each other. A plurality of reflector panels are sequentially spaced around the peripheral wall. Each of the panels is coupled to both the upper and lower hoops and lies in an outwardly flared direction. Each of the panels pivots as the hoops are displaced with respect to each other. In this manner, as the position of the sun is sensed in the sky, the control means displaces the hoops to appropriately pivot the reflector panels whereby the reflector configuration is modified in accordance with the movement of the sun across the sky.

In an embodiment of the invention, the displacement of the hoops includes a radial sliding of the hoops with respect to each other as well as planar converging of the hoops. The panels are slidably interconnected to the hoops. A single motor operates a gear system which in turn controls the sliding, rolling, extending and rotation of control arms which in turn manipulate the displacement of the hoops. An additional pivoting control can be provided to the housing whereby the entire housing can pivot about its diameter to face the arcuate direction of the sun in the sky.

The aforementioned objects, features and advantages of the invention will, in part, be pointed out with particularity, and will, in part, become obvious from the following more detailed description of the invention taken in conjunction with the accompanying drawings which form an integral part thereof.

BRIEF DESCRIPTION OF THE DRAWINGS

In the drawings:

FIG. 3 is a side sectional view taken along line 3—3 of FIG. 1;

FIG. 4A is an enlarged cross sectional view of the left side showing the position at the extreme east arm;

FIG. 4B is an enlarged cross sectional view showing the extreme west arm;

FIGS. 5A, 5B and 5C show schematic drawings of three positions of the hoops displaced with respect to each other;

FIGS. 6A, 6B, and 6C respectively show schematic drawings of the reflected light positioned for the three displacements shown in FIGS. 5A, 5B and 5C;

FIG. 7 shows a side view of one of the reflector panels interconnected to the hoops, and FIG. 8 shows an isometric view of one of the reflector panels connected to the hoops.

In the various figures of the drawing, like reference characters designate like parts.

DESCRIPTION OF THE PREFERRED EMBODIMENTS

Figure 1:
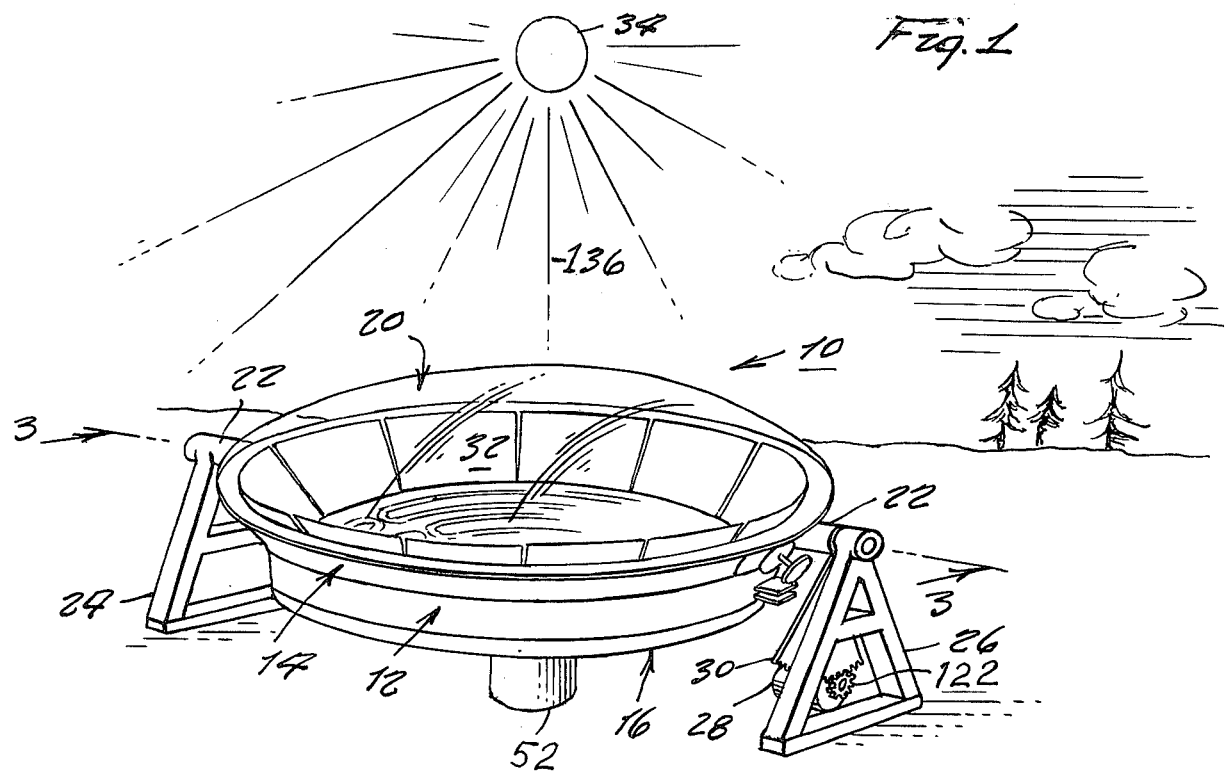
FIG. 1 is an isometric view of the solar energy reflector of the present invention.

Referring now to FIG. 1, the present invention describes a solar energy reflector system shown generally at 10 and including a circular dish-like housing 12 including an outwardly flared peripheral wall 14. The base 16 of the housing is substantially flat and includes at its center a downwardly projecting generator housing 52. The heat storage maintaining system includes a bubble. cover 20 of transparent material which permits entry of the sun's rays therethrough while at the same time protecting the system from contamination and environmental conditions.

The entire circular dish-like housing is pivoted across its diameter by means of the pivot shaft 22 which is supported by means of the support triangles 24 and 26 at either end thereof. A gear arrangement including a pinion gear 122 driving a sector gear 30 which in turn is connected to the shaft 22, permits pivoting of the entire solar energy reflecting system. As is known, during the various seasons, the arcuate path of the sun's travel across the sky may vary so that the arcuate path may lie towards the North or South. By pivoting the entire solar energy system towards that arcuate path it is possible to consistently track the arcuate movements of the sun across the sky for each day depending upon the particular season.

Internally of the solar system can be seen a series of reflector panels 32 which are each spaced adjacent to the next panels and each lie against the peripheral wall of the housing in an outwardly flared direction. The sun 34 casts its rays 136 downwardly onto the reflector system and the rays hit the individual panels 32. They are reflected off the panels internally of the housing and onto a concave reflector positioned beneath the reflecting panels 32. The concave reflector focuses and concentrates the rays onto a heating coil at the bottom of the housing.

Figure 2:
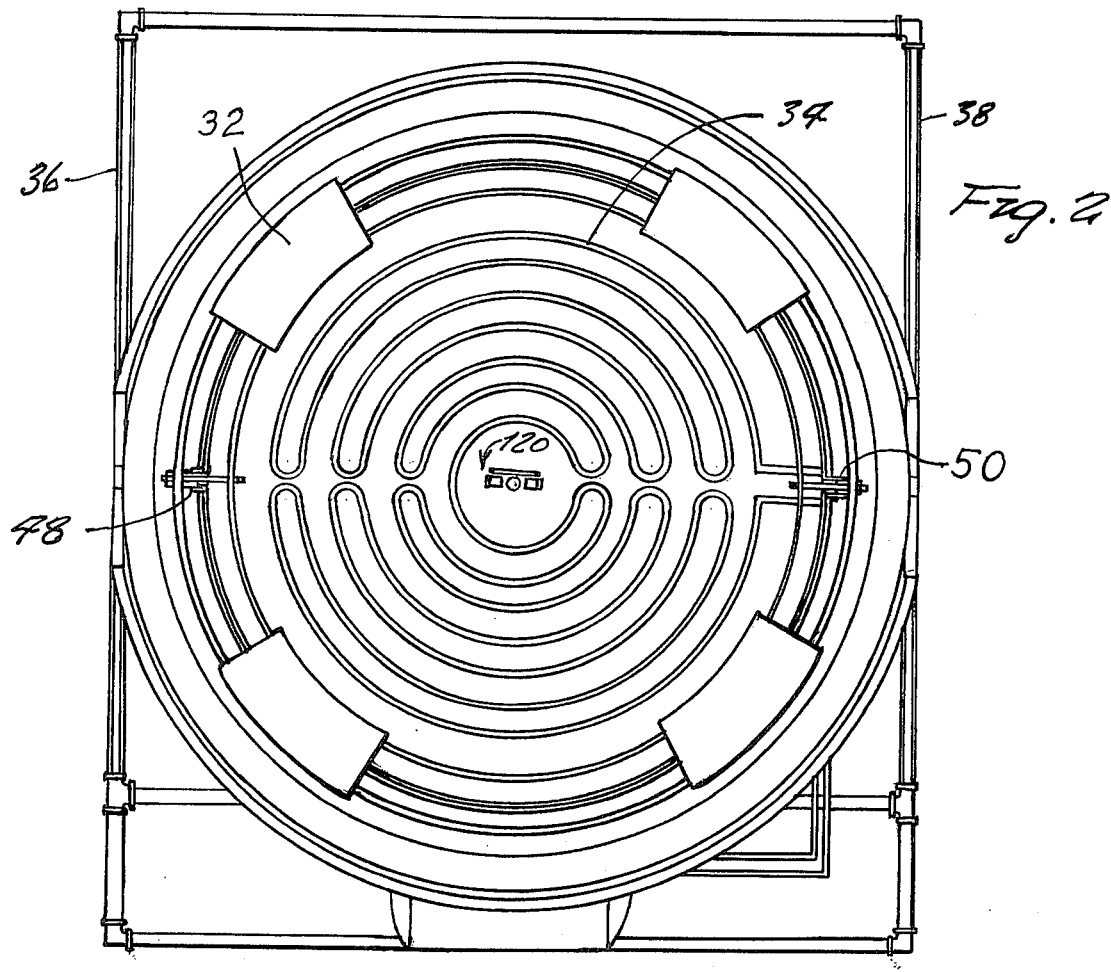
FIG. 2 is a top view of the solar energy reflector system as shown in FIG. 1.

Referring now to FIG. 2, there is shown the heating coils 34, positioned on the bottom surface of the housing. Also is shown a frame made of pipe 36 and 38 which is secured under support triangles 24 and 26 and buried in the earth for rigidity. The heating coil can be blackened to absorb more of the heat. The coils may be held in place by means of the retaining blocks and the clamps not shown. The fluid leaving the heating coils is sent to a storage tank. A turbine can be included within the system driven by the fluid. The operation of the turbine depends upon the amount of heat produced. When the temperature will support boiling, the turbine blades revolve being propelled by steam jets, which operates generator 54.

As can be seen from FIG. 1, so long as the sun is directly above the solar energy reflector system, the rays will be cast directly downward and will evenly distribute over the individual reflector panels. However, when the sun is first rising in the east, it would reflect its rays mostly on the left hand panels, as shown in FIG. 1. The right hand panels would not receive any of the rays and would therefore not be utilized in an efficient manner. Similarly, when the sun is at its extreme westerly position, prior to setting, it would cast its rays only on the right hand panels while the left panels would not be utilized.

Accordingly, in order to provide a most efficient system, it would be necessary to modify the angles of the various panels so that they each will receive a portion of the sun's rays throughout the day, regardless of the position of the sun in its arcuate path across the sky. In order to do so, it is necessary to consistently change the configuration and angular position of the various reflector panels.

In order to carry out the change in the configurations of the reflector panels, there is provided in the housing an upper hoop 44 and a lower hoop 46, as is shown in FIG. 3. The hoops are circular in shape with the upper hoop 44 being larger than the lower hoop 46. The hoops are placed in spaced apart relationship with each other. The hoops are interconnected by means of control arms 48 at the right hand side and 50 at the left hand side. The control arms 48, 50 are operated so as to displace the hoops 44, 46, with respect to each other. The displacement is such as to cause the panels, connected to the hoops, to pivot and thereby modify their angular position so as to be able to have all of the panels receive at least some of the rays of the sun as the sun's position changes in the sky.

The control arms operate by means of motor 126. Motor 126 has a shaft and pinion gear which drives gear 128.

Gear 128 is connected to shaft 70. Shaft 70 is the main driver shaft. It turns beveled pinion gear 74 which drives gear 76 along with its shaft 78. At the end of shaft 78 there is a gear arrangement 124 which drives the sector gear 80 which in turn operates the control arm 50. At the opposite end of shaft 70 beveled gear 68 is driven which drives beveled pinion gear 66. Shaft 64 which is connected to 66 turns bevel gear 60. Bevel gear 60 drives bevel pinion gear 58 which drives bevel gear 130 and also bevel gear 62.

In a similar manner, gear 62 is interconnected through a series of gears which are the same as was described for the left arm 50. These gears end in the final sector gear 82 which controls the movement of the right hand control arm 48. In FIG. 3 there is also noted the motor 28 which drives the gears 30 to control the pivotal movement of the entire housing which is support on the triangular support 26, 24.

The position of the control arms shown in FIG. 3 is such that they are at substantially equal positions which would occur for the condition shown in FIG. 1 where the sun is directly overhead and its rays cast downwardly onto the panels. However, when the sun is at its eastern rising position or western setting position, the position of the control arms is modified to cause displacement of the upper and lower hoops to thereby cause a changing of the angular positioning of the reflector panels to provide an appropriate configuration in accordance with the position of the sun in the sky.

Referring now to FIGS. 5A-5C as well as 6A-6C, the positioning of the hoops and corresponding reflector panels will be explained. In FIG. 5A there is shown the position of the reflector system when the sun is at its western position, toward evening. At that time, the rays of the sun come from the left hand side. It is noted in FIG. 6A that the left side reflector panel 84 is tilted to an extreme position approximately 15° from the horizontal. On the other hand, the right hand panel 86 is also tilted to an upward position at approximately 80° with the horizontal. Located beneath the reflector panels 84, 86 are the concave reflectors 88 which serve to concentrate the light focused thereon onto the heating coils 90.

The rays 92, which impinge the left most reflector panel 84, will be reflected and focused onto the concave reflector 88 where they can be concentrated to the heating coils 90. At the same time, rays 94 impinging on the reflector panel 86 will also reflect from it and be focused onto the concave reflectors 88 to concentrate them onto the heating coils 90.

Thus, it will be appreciated, that by tilting the panels as shown in FIG. 6A, all of the panels around the housing unit will be utilized to receive and focus the sun's rays, even though the sun is at a westernmost position. Furthermore, the angles are so arranged that all of the rays impinging on any of the reflector panels will all be focused onto the concave reflectors to be utilized by the heating coils. As a result, a most efficient system is provided whereby all of the panels are utilized, all of the rays are maintained for heating purposes, and the resultant efficiency is most high.

In order to obtain the configuration of the reflector panels as shown in FIG. 6A, the hoops 44, 46 must be displaced with respect to each other as shown in FIG. 5A. Specifically, they must be radially moved so that they are closer to each other at their right end rather than their left end, and in addition, as will hereinafter be explained, the planar relationship between the two hoops is also tilted so that the planes tend to converge toward each other at the left end, where they are further spaced apart radially. This can be understood since the upper and lower hoops are interconnected by means of a substantially fixed and uniform distance by means of the control arms. Since the radial spacing is less at the right end, the planar distance must increase to accommodate the same lengths. On the other hand, at the left side, where the radial spacing is greatest, the planar distance between the two hoops must be reduced to again accommodate the same length of the control arm. This will be further explained in connection with the operation of the control arms.

FIG. 5B and FIG. 6B respectively show the position of the hoops and the reflector panels for mid-day where the sun is substantially overhead of the reflector system. In this case the two hoops 44, 46 are substantially coaxial and are substantially in planes parallel with each other. The reflector panels are symmetrical with respect to each other and each being approximately 47.5° with respect to the horizontal. Each receive about the same amount of light from the sun and each focuses the light onto the concave reflectors 88 which in turn concentrates it onto the heating coils 90.

FIGS. 5C and 6C show the positions of the hoops and the reflector panels when the sun is at the east, during the morning hours. In this case, the upper hoop 44 is moved radially with respect to the lower hoop 46 toward the left such that their radial distance at the left is smallest, and accordingly, they would be in diverging planes at that point. On the other hand, at the right end the radial distance is greatest whereby the planes would coverge at that end. At this time, the left hand reflector panel 84 is pivoted such that it makes an angle of approximately 80° with the horizontal while the right hand panel 86 is pivoted to make an angle of approximately 15° with the horizontal. The light rays would then fall on all of the panels which would focus these rays onto the concave reflectors 88 which in turn concentrate them onto the heating coils 90.

It is therefore understood from FIGS. 5A-5C and 6A-6C that the configuration of the reflector panels is changed in accordance with the movement of the sun across the sky. While only three positions are shown, it is appreciated that the movement from the one extreme position to the other extreme position is a continuous one and there is a gradual pivoting of the reflector panels to continuously change the configuration in accordance with the instantaneous position of the sun in the sky whereby the most efficient concentration of the sun rays is achieved.

In order to carry out the change in configuration, the gear system is utilized to shift the control arms which in turn displace the upper and lower hoops with respect to each other. Referring now to FIG. 4A, it is noted that the left control arm 50 is in one extreme position and specifically in a position at the end of the day where it makes an angle of approximately 15° with the horizontal. It will be noted that the upper and lower hoops 44, 46 are in converging planes and that the radial spacing between them is at a maximum. In order to achieve this result, it will be noted that the sector gear 80 is pivotally pinned at 92 to a support post 94 connected to the housing. A rectangular member 96 having a transverse sleeve therethrough is connected to the end of the sector gear to pivot along with it. The arm 50 includes a rod 98 which passes through the sleeve of the rectangular housing 96 at the end of the sector gear 80. Compression springs 100 and 102 are placed on the rod 98 on either side of the sector gear. The rod is held in place by the arm 50 and the two hoops are connected respectively at ends of the rod. It will be noted that the rod includes a slidable extension 104 at one end thereof to which the rod 44 is connected. Also, a roller 106 is provided at the opposing end adjacent the rod connection 46.

In FIG. 4B, a similar arrangement is provided in connection with the sector gear 82 and accordingly, the details of that construction will not be described. However, it should be noted that in FIG. 4B, the position of the arm 48 is also at the evening position and makes an angle of approximately 80° with the horizontal. In this case, the extension at the upper end of the arm is in its contracted position.

In the operation of the control arm, it should be noted that as the sector gear moves upwardly from its position 4A to a position corresponding to FIG. 4B, the sleeve will tilt downwardly causing the rod to also tilt making the arm move in a clockwise position. The arm will rotate about the pivot point 92 and at the same time will slide through the sleeve so that the sleeve will move from its position adjacent the upper end of the arm as shown in FIG. 4A, to a position adjacent the lower end of the arm, as shown in FIG. 4B. At the same time, as the lower end of the arm moves inwardly adjacent the sector gear, the wheel at the bottom will commence rolling along the bottom surface of the housing. At the same time, the extension at the upper end of the arm will be moved inward of the arms. It is therefore understood that the arms are configured so as to slide, roll, extend, and rotate in moving from one extended position at the morning, to the other extended position in the evening. This movement of the arm causes the hoops to be displaced relative to each other whereby they move from a position which is radially far apart and planarly adjacent to a position whcih is radially close together and planarly spaced apart.

As is noted from the foregoing explanation, the movement of the hoops occurs in essentially two directions, a radial direction as well as a vertical direction. Therefore, a combination is made to permit such movement and at the same time provide for the appropriate pivotal movement of the reflector panels. Such a combination can be understood with reference to FIGS. 7 and 8 wherein a panel 32 is shown interconnected to the upper hoop 44 and the lower hoop 46. It will be noted that the panels are arcuate in shape whereby they can fill the periphery of the dish like shaped housing. Extending in the back of the panels are U-shaped channels 108 having their legs connected to the backwall of the panels. The hoops contain sleeves 110 passing over the hoops with protruding tabs 112 having bores 114 which receive the channels 108. The channels can slide within the bores. In this manner, as the hoops move both radially and vertically, the panel 32 will pivot until appropriately permitting the channels to slide within the bores of the connecting tabes. It will be noted that compression springs 116 are provided at the bottom to prevent the lower connecting tab to brake the bottom of the channel.

In order to track the movement of the sun across its arcuate path in the sky, a sensing device 120, shown in FIG. 2 is placed at the center of the solar energy reflector system. The sensor includes appropriate switches to turn on and off the motors which in turn commences the movement of the hoops and the associated movement of the reflector panels.

The reflector system makes one cycle, or part of that cycle per day, depending upon the amount of sunlight. One cycle consists of 520 minutes and tracks the sun along a 130° arc. The system is controlled by an electric eye formed as part of the sensing circuit. The function of the electric eye is to time and correct the elevation of the reflector system. It also starts and stops the operation of a cycle.

As the sun rises to a 25° angle, sunlight makes initial contact with the sensing circuit and specifically the elctric eye. This engages the reflector motor through the operation of a relay switch. The reflector motor operates at one revolution per minute moving the reflector from east to west, and at a rate of four revolutions per minute in the opposite direction. One revolution of the motor is converted through the gears to operate the left and right control arm ⅛th degree per minute. Accordingly, the one control arm rotates from 15° east to 80° east, while the other control arm rotates from 80° west to 15° west. Rotation of both control arms is simultaneously.

The upper and lower hoops which are connected to the control arm change the shape of the reflector panels and accordingly the configuration of the entire reflector system. This change in shape maintains a concentration of sunlight to the heating coil and the concave reflectors. The sunlight is focused by the sunlight reflectors and is directed onto the heating coil. Heat is absorbed by the heating coil and is then transferred to a storage tank through the use of a suitable fluid.

The completion of the cycle occurs when the electric eye opens a switch located at the western most position. This western switch opens to stop the operation of the reflector motor from moving from each to west.

When the sun has set to an angle below 25°, sunlight no longer contacts the contact circuit, and specifically the electric eye. The relay switch now ceases to operate and the reflector motor then operates in reverse. The reflector motor stops when the electric eye opens a switch placed at the eastern position. The reflector system is then ready for the next cycle.

There has been disclosed heretofore the best embodiment of the invention presently contemplated. However, it is to be understood that various changes and modifications may be made thereto without departing from the spirit of the invention.

What is claimed is:

1. A solar energy reflector system comprising:
   a. a circular dish-like housing with outwardly flared peripheral walls;
   b. upper and lower circular hoops supported within said housing in spaced relationship to each other, the upper hoop being largerthan the lower hoop;
   c. means for mounting said hoops within said housing for movement relative to each other;
   d. sensing means for detecting the position of the sun in the sky;
   e. control means coupled to said upper and lower hoops responsive to said sensing means for displacing the hoops relative to each other;
   f. a plurality of refelctor panels sequentially spaced around said peripheral wall; and
   g. means for pivotally connecting said panels to said upper and lower hoops to lie in an outwardly flared direction, each of said panels pivoting with the displacement of said hoops, whereby the reflector configuration of the system is modified in accordance with the movement of the sun across the sky.

2. A solar energy system as in claim 1, wherein said control means comprises a motor, a gear system coupled to said motor, and control arms coupled between said upper and lower hoops in diametrically opposed position on said housing, said control arms operated by said gear system to cause radial sliding and planar converging of said hoops with respect to each other.

3. A solar energy system as in claim 2, and further comprising coupling means slidably interconnecting each of said reflector panels with said upper and lower hoops.

4. A solar energy system as in claim 2 and wherein the final gear of said gear system includes a sector gear respectively associated with each of said control arms, the output end of said sector gears pivotally attached to said housing, a sleeve fixed to the output end of each of said sector gears to respectively pivot therewith, said arms slidably retained within respective sleeves, whereby said arms can slide in said sleeves as well as pivot relative to said housing.

5. A solar energy system as in claim 4 and wherein each of said arms further comprise rolling means on the lower ends thereof for rolling on a surface of said housing, and extension means at the other end thereof, said upper hoop coupled to said extension means and said lower hoop coupled to the lower end of each control arm.

6. A solar energy system as in claim 1 and further comprising concave reflector means circularly positioned in said housing means and spaced beneath said reflector panels, for receiving sunlight reflected from said reflector panels.

7. A solar energy system as in claim 6 and further comprising a heating coil placed adjacent the bottom of said housing means, said concave reflector means concentrating the reflected sunlight onto the heating coils.

8. The solar energy system as in claim 1, wherein said sensing means detects the rising of the sun to a predetermined angular position to thereby provide a foward signal, and detects the setting of the sun below a predetermined angular position to thereby provide a reverse signal, and wherein said control means comprises drive means responsive to said forward signal to displace said hoops with respect to each other in a first direction and responsive to said reverse signal to displace said hoops with respect to each other in an opposite direction.

9. A solar energy system as in claim 8 and wherein said displacement in said opposite direction is substantially faster than said displacement in said first direction.

10. A solar energy reflector system as in claim 1 and further comprising pivot means for pivoting said dish-like housing about a diameter, to face the reflector panels toward the arcuate direction of the sun in the sky.

* * * * *